(12) United States Patent
Kumar et al.

(10) Patent No.: US 8,429,276 B1
(45) Date of Patent: Apr. 23, 2013

(54) DYNAMIC RESOURCE ALLOCATION IN VIRTUAL ENVIRONMENTS

(75) Inventors: Kartik Kumar, Bangalore (IN); Chandrasekaran Rajagopalan, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 367 days.

(21) Appl. No.: 12/911,337

(22) Filed: Oct. 25, 2010

(51) Int. Cl.
*G06F 15/173* (2006.01)

(52) U.S. Cl.
USPC .............. 709/226; 709/229; 718/1; 718/104

(58) Field of Classification Search .......... 709/223–226, 709/229; 718/1, 100, 102, 104
See application file for complete search history.

(56) References Cited

U.S. PATENT DOCUMENTS

| | | | |
|---|---|---|---|
| 5,694,606 A | 12/1997 | Pletcher et al. | |
| 6,542,926 B2 | 4/2003 | Zalewski et al. | |
| 6,757,897 B1 | 6/2004 | Shi et al. | |
| 6,766,398 B2 | 7/2004 | Holm et al. | |
| 6,820,164 B2 | 11/2004 | Holm et al. | |
| 6,944,699 B1 | 9/2005 | Bugnion et al. | |
| 6,961,941 B1 | 11/2005 | Nelson et al. | |
| 7,093,024 B2 | 8/2006 | Craddock et al. | |
| 7,170,862 B1* | 1/2007 | Mountcastle | 709/226 |
| 7,254,652 B2 | 8/2007 | Anderson et al. | |
| 7,263,091 B1 | 8/2007 | Woo et al. | |
| 7,310,314 B1 | 12/2007 | Katz et al. | |
| 7,325,062 B2* | 1/2008 | Hamilton et al. | 709/226 |
| 7,444,398 B1* | 10/2008 | Matthews | 709/226 |
| 7,765,552 B2* | 7/2010 | Miller et al. | 718/104 |
| 7,788,368 B1 | 8/2010 | Scano et al. | |
| 7,813,264 B2 | 10/2010 | Haq et al. | |
| 7,930,443 B1 | 4/2011 | Sullivan | |
| 8,005,979 B2 | 8/2011 | Dinker et al. | |
| 8,102,781 B2* | 1/2012 | Smith | 709/226 |
| 8,250,213 B2* | 8/2012 | Glover et al. | 709/226 |
| 2002/0052914 A1 | 5/2002 | Zalewski et al. | |
| 2003/0101440 A1 | 5/2003 | Hardin et al. | |

(Continued)

OTHER PUBLICATIONS

White paper: "VMware Infrastructure, Resource Management with VMware DRS," VMware Best Practices, 2006, 24 pp. NOTE: The publication date of 2006 is sufficiently earlier than the effective U.S. filing date of Oct. 25, 2010, and any foreign priority date, of which there is none, so that the particular month of publication is not in issue.

(Continued)

*Primary Examiner* — Bharat N Barot
(74) *Attorney, Agent, or Firm* — Shumaker & Sieffert, P.A.

(57) ABSTRACT

In general, techniques are described for dynamic resource allocation in virtual environments. A network device comprising physical resources, a first virtual machine (VM), a second VM and a hypervisor may implement these techniques. The first VM executes within a first partition of the physical resources to process a first portion of received network traffic, while the second MV executes within a second partition of the physical resources to process a second portion of the received network traffic. The first VM determines whether physical resources in addition to those allocated by way of the first partition are required to process the incoming network traffic and issues a request requesting additional physical resources based on the determination. Either the second VM or the hypervisor, in response to the request, dynamically reallocates at least a portion of the physical resources allocated to the second partition to the first partition.

29 Claims, 5 Drawing Sheets

U.S. PATENT DOCUMENTS

| | | | |
|---|---|---|---|
| 2004/0268347 | A1 | 12/2004 | Knauerhase et al. |
| 2005/0132367 | A1 | 6/2005 | Tewari et al. |
| 2005/0182853 | A1 | 8/2005 | Lewites et al. |
| 2005/0235123 | A1 | 10/2005 | Zimmer et al. |
| 2005/0251806 | A1 | 11/2005 | Auslander et al. |
| 2006/0143617 | A1 | 6/2006 | Knauerhase et al. |
| 2006/0221832 | A1 | 10/2006 | Muller et al. |
| 2010/0175063 | A1* | 7/2010 | Ciano et al. .................. 718/1 |
| 2011/0185064 | A1* | 7/2011 | Head et al. .................. 709/226 |

OTHER PUBLICATIONS

VMware, VCMI Sockets Programming Guide, VMware ESX/ESXi 4.x, VMware Workstation 7.x, VMware Server 2.0, last revised May 2010, 28 pp.

Intel Architectural Software Developer's Manual vol. I, 1999, Intel Corp., 369 pp.

Intel Architectural Software Developer's Manual vol. II, 1999, Intel Corp, 854 pp.

Intel Architectural Software Developer's Manual vol. III, 1999, Intel Corp., 658 pp.

Tanenbaum, Modern Operating Systems, 2001, Prentice Hall, pp. 53-56, 132-135.

Dell, VMware ESX Server 2.1 Software for Dell PowerEdge Servers, Deployment Guide, Apr. 2004, 30 pp.

Dell, VMware ESX Server 2.1 Software Memory Sizing Guide for Dell PowerEdge Systems, Version 1.0, Jun. 2004, 17 pp.

Intel Architectural Software Developers Manual, accessed Apr. 12, 2007, 32 pp.

* cited by examiner

DYNAMIC RESOURCE ALLOCATION IN VIRTUAL ENVIRONMENTS

TECHNICAL FIELD

The invention relates to network devices and, more particularly, to network devices that implement virtual environments.

BACKGROUND

Network devices, such as routers, hubs, switches, and servers, often implement virtual environments. In the instance of data servers, any given data server may include physical resources, such as processors, memory and storage space. Each of these virtual machines receives a separate portion of the underlying physical resources in which to execute. The virtual environment maintains these portions in a manner that virtual machines appear to one another as separate network devices, hence the name "virtual machines." Acting as standalone machines or network devices, each of these virtual machines may act as a separate network device. For example, one virtual machine may operate as a first data server while another as a second data server.

Generally, the virtual environment is managed and monitored by what is commonly referred to as a "hypervisor" or a "virtualization manager." The hypervisor forms a virtualization layer that abstracts the physical resources into the multiple virtual machines and allows independent operating systems to execute for each of the virtual machines. In other words, the hypervisor forms the partitions of physical resources and assigns these partitions to each of the virtual machines for their independent allocation and use by the corresponding operating system. The hypervisor usually performs a form of static resource allocation, meaning that an administrator or other user defines the partitions of physical resources for each of the virtual machines and the hypervisor then abstracts the various physical resources into the defined partitions. The virtual machines then execute within their respective physical resource partition as if the virtual machine is a stand-alone or separate network device. The hypervisor maintains the separation between these partitions, managing conflicts and other issues that arise when two or more virtual machines attempt to utilize the same physical resource.

SUMMARY

In general, the techniques are described that enable a form of dynamic resource allocation within virtual environments that avoids potential resource underutilization that often results when implementing static resource allocation in these virtual environments.

As one example, a network device may implement a virtual environment in which two or more virtual machines execute. A first virtual machine may provide, for example, secure socket layer (SSL)-virtual private network (VPN) services for an active enterprise customer while the second virtual machine provides SSL-VPN services for a relatively inactive enterprise customer. In static resource allocation, the first virtual machine may fully utilize the physical resources assigned to it by way of its resource partition, while the second virtual machine may likely only utilizes a small portion of its resources available to it by way of its resource partition. In static resource allocation, a hypervisor that manages the virtual environment does not intervene support the dynamic reallocation of these resources either to add additional resources to the first resource partition or to redistribute the resources of the partition assigned to the second virtual machine to the partition assigned to the first virtual machine. In contrast, the dynamic resource allocation techniques described in this disclosure may facilitate transfer of resources from a first resource partition to a second resource partition without interrupting the current execution of either of the first or second virtual machines.

Moreover, the dynamic resource allocation techniques described in this disclosure may be virtual machine initiated. That is, any virtual machine executing within the virtual environment may communicate its request for additional physical resources to either another virtual machine or to the hypervisor to initiate dynamic resource reallocation. When requesting the additional physical resources from the other virtual machines, the requesting virtual machine may store data indicating which of the remaining virtual machines to which it should send reallocation requests and a priority order by which to issue these requests to these remaining virtual machines. In this instance, the requesting virtual machine stores data identifying the other virtual machines, and in this sense, the requesting virtual machine may be considered aware of the other virtual machines with which it shares the physical operating environment. In the example where a virtual machine requests additional physical resources from the hypervisor, the requesting virtual machine need not be aware of the remaining virtual machines and the hypervisor is responsible for locating the additional physical resources and providing them to the requesting virtual machine. In both of the above instances, the techniques may, in this manner, enable virtual machine-initiated dynamic resource allocation within virtual environments so as to potentially improve physical resource utilization when compared to static resource allocation in virtual environments.

In one embodiment, a method comprises partitioning, with a hypervisor executing within a network device, physical resources of the network device to allocate a first portion of the physical resources to a first virtual machine and a second portion of the physical resources to a second virtual machine and executing the first and second virtual machines within the respective first and second partitions of the physical resources to process first and second portions of network traffic received by the network device. The method also comprises determining, with the first virtual machine executing within the first partition of physical resources of the network device, whether physical resources in addition to those allocated in the first partition are required to process the first portion of the incoming network traffic, requesting, with the first virtual machine, additional physical resources of the network device based on the determination and dynamically reallocating at least a portion of the physical resources allocated to the second partition to the first partition in response to the request so as to form an expanded first partition of the physical resources in which the first virtual machine executes to process the first portion of the incoming network traffic and a reduced second partition in which the second virtual machine executes to process the second portion of the incoming network traffic. The method further comprises executing the first virtual machine within the expanded first partition to process the first portion of the incoming network traffic and executing the second virtual machine within the reduced second partition to process the second portion of the incoming network traffic.

In another embodiment, a network device comprises at least one interface that receives network traffic, physical resources, a first virtual machine executing within a first partition of the physical resources to process a first portion of the network traffic, a second virtual machine executing within a second partition of the physical resources to process a second portion of the network traffic and a hypervisor that partitions the physical resources to allocate the first portion of the physical resources to the first virtual machine and the second portion of the physical resources to the second virtual machine. The first virtual machine determines whether physical resources in addition to those allocated by way of the first partition are required to process the incoming network traffic, and issues a request directly to the second virtual machine requesting that the second virtual machine reallocate at least a portion of the physical resources allocated to the second partition based on the determination. In response to the request, the second virtual machine dynamically reallocates at least a portion of the physical resources allocated to the second partition to the first partition in response to the request so as to form an expanded first partition of the physical resources in which the first virtual machine executes to process the incoming network traffic and a reduced second partition in which the second virtual machine executes to process the incoming network traffic. The first virtual machine executes within the expanded first partition to process the first portion of the incoming network traffic. The second virtual machine executes within the reduced second partition to process the second portion of the incoming network traffic.

In another embodiment, a network device comprises at least one interface that receives network traffic, physical resources, a first virtual machine executing within a first partition of the physical resources to process a first portion of the network traffic, a second virtual machine executing within a second partition of the physical resources to process a second portion of the network traffic and a hypervisor that partitions the physical resources to allocate the first portion of the physical resources to the first virtual machine and the second portion of the physical resources to the second virtual machine. The first virtual machine determines whether physical resources in addition to those allocated by way of the first partition are required to process the incoming network traffic, and issues a request to the hypervisor requesting physical resources in addition to the physical resources allocated to the first partition based on the determination. The hypervisor dynamically reallocates at least a portion of the physical resources from the second partition to the first partition in response to the request so as to form an expanded first partition of the physical resources in which the first virtual machine executes to process the incoming network traffic and a reduced second partition in which the second virtual machine executes to process the incoming network traffic. The first virtual machine executes within the expanded first partition to process the first portion of the incoming network traffic. The second virtual machine executes within the reduced second partition to process the second portion of the incoming network traffic.

In another embodiment, a non-transitory computer-readable medium storing instructions, that when executed by a processor, cause the processor to partition, with a hypervisor executing within a network device, physical resources of the network device to allocate a first portion of the physical resources to a first virtual machine and a second portion of the physical resources to a second virtual machine, execute the first and second virtual machines within the respective first and second partitions of the physical resources to process first and second portions of network traffic received by the network device, determine, with the first virtual machine executing within the first partition of physical resources of the network device, whether physical resources in addition to those allocated in the first partition are required to process the first portion of the incoming network traffic, request, with the first virtual machine, additional physical resources of the network device based on the determination, dynamically reallocate at least a portion of the physical resources allocated to the second partition to the first partition in response to the request so as to form an expanded first partition of the physical resources in which the first virtual machine executes to process the first portion of the incoming network traffic and a reduced second partition in which the second virtual machine executes to process the second portion of the incoming network traffic, execute the first virtual machine within the expanded first partition to process the first portion of the incoming network traffic, and execute the second virtual machine within the reduced second partition to process the second portion of the incoming network traffic.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
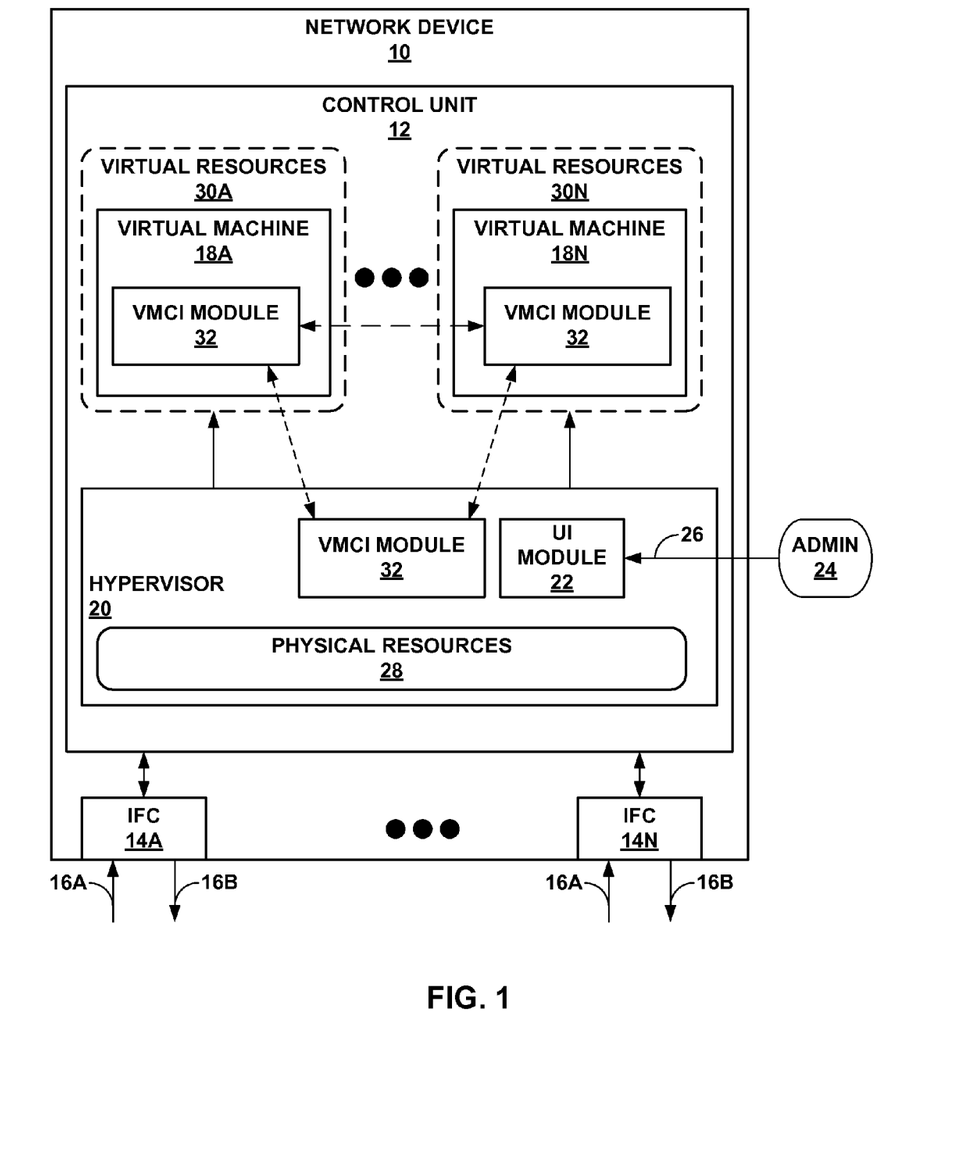
FIG. 1 is a block diagram illustrating an example network device that implements the dynamic physical resource reallocation techniques described in this disclosure.

FIG. 1 is a block diagram illustrating an example network device 10 that implements the dynamic physical resource reallocation techniques described in this disclosure. While described with respect to a particular type of device, i.e., a network device in this example, the techniques may be implemented by any type of device capable of implementing a virtual environment in which two or more virtual machines execute. In the example of FIG. 1, network device 10 represents a secure socket layer (SSL)-virtual private network (VPN) appliance that provides SSL-VPN services so as to encrypt VPN network traffic for transit through a public network and decrypt VPN network traffic for delivery to a customer device or a customer site.

In the example of FIG. 1, network device 10 includes a control unit 12 and a plurality of interface cards (IFCs) 14A-14N ("IFCs 14"). Control unit 12 may represent a combination of hardware and software, where hardware, such as processors, execute software instructions (usually in the form of a computer or software program) to implement the various aspects of the techniques described in this disclosure. The software instructions may be stored to a non-transitory computer-readable data storage medium. Example non-transitory computer-readable data storage mediums may include volatile memory, such as random access memory (RAM), dynamic RAM (DRAM) and other non-volatile memories, and/or non-volatile memories, such as static RAM (SRAM), read-only memory (ROM), electronic erasable ROM (EE-ROM), or any other type of non-volatile memory. Computer-readable data storage mediums may also include, as another example, storage devices such as compact disk ROMs (CD-ROMs), digital video disk ROMS (DVDs), hard drives, so-called "thumb drives," or any other type of storage device. In this sense, this computer-readable data storage medium may comprise the software instructions. Alternatively, control unit 12 may represent hardware, which for example may include one or more digital signal processors (DSPs), general purpose microprocessors, application specific integrated circuits (ASICs), field programmable logic arrays (FPGAs), or other equivalent integrated or discrete logic circuitry.

IFCs 14 generally represent hardware or a combination of hardware and software that provides an interface by which to send and receive network traffic. IFCs 14 generally include at least one interface, such as a port, with which to interface with a communication medium, such as a network link. Rather than show individual ports and communication mediums, the example of FIG. 1 illustrates incoming network traffic 16A and outbound network traffic 16B that is received and sent, respectively, via the ports and communication mediums. Network traffic 16A, 16B ("network traffic 16") may include data in the form of packets, where such packets conform to the Internet protocol (IP). As noted above, this network traffic 16 may represent VPN network traffic and therefore may be referred to as VPN network traffic 16.

Control unit 12 implements a virtual environment in which a plurality of virtual machines (VMs) 18A-18N ("virtual machines 18" or "VMs 18") execute. Within the virtual environment, hypervisor 20 executes to generally manage or otherwise initiate, monitor and maintain virtual machines 18. For this reason, hypervisor 20 may also be referred to as a virtual machine manager (VMM) 20.

Virtual machines 18 generally represent software abstractions of individual or separate computing devices. That is, virtual machine 18A, for example, appears to virtual machine 18B and other external devices as a separate device that is uniquely addressable from a networking perspective. As a result, virtual machine 18A has its own network address, e.g., IP address, and otherwise executes as if it is a separate device. Each of virtual machines 18 may execute their own operating system (which is often abbreviated as "O/S"), as well as, one or more applications. To the extent that these virtual machines execute their own operating system and their own applications, these virtual machines 18 represent virtual computers or machines.

In some instances, these virtual machines 18 may execute their own operating systems and a limited set of dedicated software programs such that these virtual machines 18 appear as dedicated network appliances. In these instances, virtual machines 18 may be referred to as "virtual appliances 18" as these virtual machines 18 do not resemble a general purpose computer but rather a dedicated network appliance. For the purposes of this disclosure, the term "virtual machine" generally refers the overall class of virtual machines, which includes both the generally accepted meaning of a virtual computing device as well as the specific sub-class of virtual devices referred to as virtual appliances. The term "virtual appliances" refers to this sub-class of virtual devices that have been specifically provisioned to act as a dedicated network appliance device, such as an SSL-VPN network appliance. It is assumed for the remainder of this disclosure that each of virtual machines 18 represents virtual appliances and more particularly SSL-VPN virtual appliances. While described with respect to this SSL-VPN service context, the techniques described in this disclosure should not be limited to this context but, again, may be generally applicable within any context where a device implements a virtual environment in which two or more virtual machines execute.

To implement this virtual environment, upon startup, control unit 12, as one example, loads a host operating system, which then hosts the virtual environment in which hypervisor 20 executes. This first example is often referred to as "bootstrap execution" in that the desired environment to execute, i.e., the virtual environment in this example, requires the operating system to load first so that the virtual environment can be loaded. Alternatively, control unit 12 directly executes the virtual environment without first loading the operating system contrary to the bootstrapping case noted above. This alternative way of loading the virtual environment is often referred to as a "bare metal execution" in that the virtual environment executes directly upon the physical resources, which are often composed of various metals. In this bare metal execution, the virtual environment incorporates its own kernel to permit this form of execution, while in bootstrap execution the virtual environment relies on the kernel of the operating system to provide access to the physical resources.

Once running via either bootstrap execution or bare metal execution, an administrator or other user generally interfaces with a user interface (UI) module presented by the virtual environment. Often, in bootstrap execution, the virtual environment uses the host operating system as the initial UI module by which the administrator may interface with the virtual environment to provision, configure, monitor otherwise manage the virtual environment. In bare metal execution, the virtual environment provides its own UI module by which the administrator may interface with the virtual environment to provision, configure, monitor otherwise manage the virtual environment. In the example of FIG. 1, hypervisor 20 includes a UI module 22 with which an administrator 24 ("admin 24") interfaces to provision, configure, monitor otherwise manage the virtual environment.

In configuring the virtual environment, UI module 22 receives configuration data 26 from admin 24 specifying partitions of underlying physical resources 28 of network device 10. Each of these physical resource partitions are allocated to a different one of virtual machines 18. Once allocated, the virtual environment presents these partitions of physical resources 28 as virtual resources 30A-30N ("virtual resources 30"). Often, hypervisor 20 stores data defining these physical resources 28 and reference to physical resources 28 and the partitions thereof refer to virtually partitioning this data defining the physical resources 28. In other words, physical resources 28 shown in the example of FIG. 1 represent data stored by hypervisor 20 identifying the actual physical resources of the network device. Hypervisor 20 may therefore be considered aware of the underlying physical resources of network device 10 and maintains physical resources 28 to reflect the current state of the actual physical resources within network device 10. Once admin 24 defines the partitions of physical resources 28, the virtual environment abstracts the actual underlying physical resources to form virtual resources 30A-30N such that it appears as if each of virtual machines 18 have access to their own physical resources when in fact each of these virtual machines 18 are time sharing at least some of the actual physical resources, such as processors and/or memories.

Physical resources 28 may therefore represent data identifying the actual physical resources for use in provision virtual resources 30. Example physical resources may include a number, type, brand, speed and other information defining properties of processors, an amount, type, brand, speed and other information defining properties of memories, an amount, type, brand, speed and other information defining properties of hard-drives, optical drives or any other component or physical resource typically known to operating systems or virtual environments.

After defining these partitions and thereby establishing virtual resources 30, hypervisor 20 instantiates each of virtual machines 18 within their respective partitions represented by virtual resources 30. Virtual machines 18 execute upon virtual resources 30 to, in this example, provide SSL-VPN services. The SSL of SSL-VPN refers to the SSL protocol or its successor, transport layer security (TLS), that provides encryption at the application layer (or layer 7) of the Open Systems Interconnection (OSI) model to ensure secure end-to-end communication at the transport layer (which is layer four of the OSI model). The VPN portion of SSL-VPN refers to a form of virtual network that enables client devices to remotely access a geographically distant site as if the client device was directly connected to this site. Often, SSL-VPN appliances are utilized in enterprise networks to enable client devices located in a geographical location remote from the location of the main or central office to securely access the enterprise network operated by the central office. In some instances, these client devices interfaces with a computer located within the central office as if they were directly interfacing with that computer. That is, these client devices may reproduce a desktop or other user interface presented by the computer located within the enterprise network and effectively control this computer as if the user was directly interfacing with this computer.

Prior to allowing the remote client devices to access the enterprise network hosted by the central office, these SSL-VPN appliances challenge the remote client devices to provide authentication information. If this authentication information is successfully authenticated by the SSL-VPN appliance, the SSL-VPN appliance configures an SSL session, which effectively forms a secure tunnel between the remote client device and the enterprise network though whatever network couples the remote client device to the enterprise network (usually, a public network such as the Internet). The client device encrypts communications entering this tunnel and decrypts communications emerging from this tunnel, while the SSL-VPN appliance performs the same encryption and decryption functions for the enterprise network. Through this tunnel, the remote client device and the enterprise network form a virtual private network (VPN), where to both the remote client device and the enterprise network it appears as if these two devices are directly connected when, in fact, the remote client device and the enterprise network are separated by an intervening public network, as one example.

In any event, as virtual machines 18 execute to process network traffic 16 and provide SSL-VPN services, each of virtual machines 18 may experience different loads. For example, one of virtual machines 18, e.g., virtual machine 18A, may process network traffic 16 for a particularly active enterprise network while another one of virtual machines 18, e.g., virtual machine 18N, may process network traffic 16 for a relatively inactive enterprise network. In this instance, even though virtual environments enable better utilization of the underlying physical resources when compared to a dedicated appliance, such as an SSL-VPN appliance, virtual machine 18N may not fully utilize its allocated portion of the underlying physical resources, which again are referred to as virtual resources 30N in this example. Virtual machine 18A, however, fully utilizes its virtual resources 30A and may require additional virtual resources to better service this network traffic 16 for the active enterprise network. In the context of virtual network appliances, virtual environments may not overcome all utilization issues considering that virtual network appliances are subject to varying loads as network traffic patterns change and fluctuate dynamically on a day-to-day or even hour-to-hour or minute-to-minute basis.

In accordance with the techniques described in this disclosure, each of virtual machines 18 implements a virtual machine communication interface (VMCI) by which virtual machines 18 dynamically negotiate the addition of resources to its virtual resources in response to changes in utilization of respective virtual resources 30. Rather than hypervisor 20 statically assigning virtual resources 30 for use by only a single corresponding virtual machine 30, virtual machines 18 dynamically expand and contract virtual resources 30 using the techniques described in this disclosure to balance utilization of resources across all of virtual machines 18. Dynamically allocating resources in this manner may enable virtual machines 18 to accommodate changes in network traffic patterns so that virtual machines 18 may better service network traffic 16 and better utilize the underlying hardware resources.

Commonly, these techniques may be implemented in resource constrained network devices where all of the underlying physical resources are partitioned equally among virtual machine 18. In these instances, a given virtual machine 18 may issue requests via the VMCI to either another one of virtual machines 18 or hypervisor 20 depending on the implementation of the techniques described in this disclosure. When issuing requests for additional resources to another one of virtual machines 18, the requesting one of virtual machines 18 may store virtual machine data identifying the remaining ones of virtual machines 18. Each of virtual machines 18 generally update this data to reflect the current state of virtual machines 18, which increases overhead with respect to this first VM-to-VM implementation. In the VM-to-hypervisor implementation, virtual machines 18 need not store this virtual machine data. Instead, hypervisor 20 stores and otherwise maintains this data to ensure it accurately represents the state of virtual machines 18, e.g., whether they are currently active or virtually powered-on. While this VM-to-hypervisor implementation reduces overhead processing with respect o virtual machines 18, the VM-to-hypervisor implementation may involve more overhead considering it takes two messages to perform any operation (such as a request) when the same operation in the VM-to-VM implementation usually only involves a single message.

In either context, control unit 12 executes virtual machines 18 using their allocated virtual resources 30A to process network traffic 16 received via IFCs 14. While processing network traffic 16, virtual machines 18 determine whether physical resources in addition to those allocated in virtual resources 30 are respectively required to process incoming network traffic 16A. For example, virtual machine 18A may monitor utilization of virtual resources 30A to assess whether additional virtual resources are required, where such monitoring may involve determining a virtual processor utilization and a queue depth or total memory usage. When virtual processor utilization exceeds a certain pre-defined or, in some instances, dynamic threshold, virtual machine 18A may request additional physical resources via its corresponding implementation of VMCI, which is illustrated as VMCI module 32. Each of virtual machines 30 includes a corresponding VMCI module 32. In the VM-to-hypervisor implementation, hypervisor 20 also includes a VMCI module 32 to communicate with virtual machines 18.

Returning to the example above, virtual machine 18A invokes VMCI module 32 to issue the request to negotiate the addition of resources to its virtual resources 30A in response to determining that utilization of one or more of virtual resources 30A exceeds a threshold utilization. In the VM-to-VM implementation, VMCI module 32 issues the request to one or more of virtual machines 18B-18N. In the VM-to-hypervisor implementation, VMCI module 32 of virtual machine 18A issues the request to hypervisor 20, which invokes its VMCI module 32 to redirect the request to one or more of virtual machines 18B-18N. Regardless of the implementation, one or more of virtual resources 30B-30N are dynamically reallocated as virtual resources 30A so as to expand virtual resources 30A in which virtual machine 18A executes to process incoming network traffic 16. That is, one of virtual machines 18B-18N releases one or more of its allocated virtual resources 30B-30N to what may be referred to as a free pool of resources that is maintained by hypervisor 20, but not shown for ease of illustration purposes. Once released, hypervisor 20 can reallocate those resources to virtual machine 18A as virtual resources 30A so as to expand virtual resources 30A in which virtual machine 18A executes to process incoming network traffic 16.

In the VM-to-VM implementation, for example, VMCI module 32 of virtual machine 18A maintains data identifying an order by which to issue requests to the remaining ones of virtual machines 18. This order, as one example, indicates that the request should first be issued to virtual machine 18B, then virtual machine 18C, followed by virtual machine 18N, etc. With respect to this order, VMCI module 32 of virtual machine 18A first issues a request to virtual machine 18B. If virtual machine 18B cannot release any resources, e.g., when virtual machine 18B is fully utilizing its virtual resources 18B, VMCI module 32 of virtual machine 18B responds to the request to indicate it cannot release any resources for use by virtual machine 18A. VMCI module 32, in response to this response from virtual machine 18B, issues the request to virtual machine 18C. Assuming virtual machine 18C has virtual resources 30C it can release, virtual machine 18C agrees to release these resources and responds to virtual machine 18A's request for additional resources with a response indicating it has agreed to release resources for use by virtual machine 18A. Virtual machine 18A, in response to receiving this response from virtual machine 18C, once again invokes its VMCI module 32 to issue a message to hypervisor 20. This message sent to hypervisor 20 instructs hypervisor 20 to move resources 30C virtual machine 18C agreed to release from virtual machine 18C to virtual resources 30A.

Hypervisor 20, as is the case in the below VM-to-hypervisor context, may maintain virtual resources 30 as an abstraction and, as a result, may manage the actual movement of resources from virtual resources 30C to virtual resources 30A without disrupting virtual machines 18A, 18C. Hypervisor 20 may, for example, reallocate physical memory assigned to virtual machine 18C as a portion of virtual resources 30C to virtual machine 18A by reducing the memory range assigned to virtual machine 18C. Reducing this memory range may require copying and moving data stored to the reallocated portion of the memory or otherwise reorganizing data to facilitate the reallocation. In some instances, a portion of virtual resources 30 for each of virtual machines 18 may be reserved for reallocation and only usable upon exceeding a threshold, such as 90% processor utilization or 90% memory utilization. By reserving dedicated portions that can only be used during peak traffic times, hypervisor 20 may alleviate the need to copy data to facilitate the memory and/or processor reallocation.

In the VM-to-hypervisor implementation, hypervisor 20 stores data defining the order, often in the form of general rules or other conditions, by which requests for additional resources should be redirected to virtual machines 18. Hypervisor 20, in this VM-to-hypervisor implementation, may receive responses from remaining virtual machines 18B-18N and perform the reallocation without receiving the reallocation message described above with respect to the VM-to-VM implementation. Otherwise, virtual machines 18 and hypervisor 20 function in a manner similar to that described above with respect to the VM-to-VM implementation with respect to releasing resources and issuing responses.

To release resources, virtual machines 18 often adjust their use of virtual resources, thereby freeing up at least a portion of virtual resources 30 for use by the requesting one of virtual machines 18. That is, virtual machines 18 typically execute a number of utilities that perform system activities, such as taking a periodic system snapshot for backup purposes, event or periodic logging for debug purposes, node monitoring, finding timed-out users, removing invalid network sessions, network cockpit graphing (which involves graphing to show system parameters, like the number of concurrent users, central processing unit (CPU)/memory utilization, number of connections of different kinds, hits per second, throughput, etc.), performing periodic domain name service (DNS) resolution, cleaning up of stale secure SSL VPN meeting sessions, and performing dynamic policy evaluation for currently logged-in users. In response to a request for additional resources, one or more of virtual machines 18 may stop or, in some instances, delay the frequency of execution of these system activities so as to free up various physical resources allocated to that machine as its corresponding one of virtual resources 30.

Each of virtual machines 18 may, for example, store data defining a prioritized list of non-essential services. Virtual machines 18C, for example, may step through the prioritized list of non-essential services and shutdown or scale back execution of the first service on the prioritized list. Virtual machine 18C, which has been monitoring its resource utilization with respect to this service and every other service on the list, may then evaluate the amount of resources released with respect to these service profiles. If not enough resources were released to satisfy the request, virtual machine 18C may then continue to scale back execution of this first service. If upon evaluating this first service, virtual machine 18C determines that it has still not released enough resources to satisfy the request, virtual machine 18C next considers the second service on the prioritized list. Virtual machine 18C continues in this manner until either enough resources have been released or virtual machine 18C can no longer scale back or shutdown sufficient services to satisfy the request. Even upon failing to satisfy the request, virtual machine 18C may still respond with the resources it has managed to release. Virtual machine 18A may receive multiple responses agreeing to release a portion of the originally requested resources and present these portions to hypervisor 20, which may then reallocate portions of the originally requested resource in a manner such that virtual machine 18A receives all of the originally requested resources. While described with respect to system operations or activities, any other activity may be dynamically adjusted so as to free up or otherwise release virtual resources 30. The techniques should not be limited in this respect to freeing up resources only by stopping, delaying or otherwise adjusting execution of system utilities.

Once the additional physical resources are released by one of the remaining ones of virtual machines 18 and dynamically reallocated to, for example, virtual machine 18 in the form of virtual resources 30, virtual machine 18A executes within what may be considered an expanded virtual resources 30 or an expanded partition of physical resources 28 to process its portion of incoming network traffic 16. The one of virtual machines 18 that released these additional resources, i.e., virtual resource 18C in the example above, then executes within the reduced second partition of physical resources 28, which is referred to as virtual resources 30C, to process its portion of incoming network traffic 16. In this manner, the techniques facilitate VM-initiated dynamic resource allocation in a virtual environment to better balance utilization of physical resources within the virtual environment in a manner that accommodates unequal traffic flows and other network circumstances.

Figure 2:
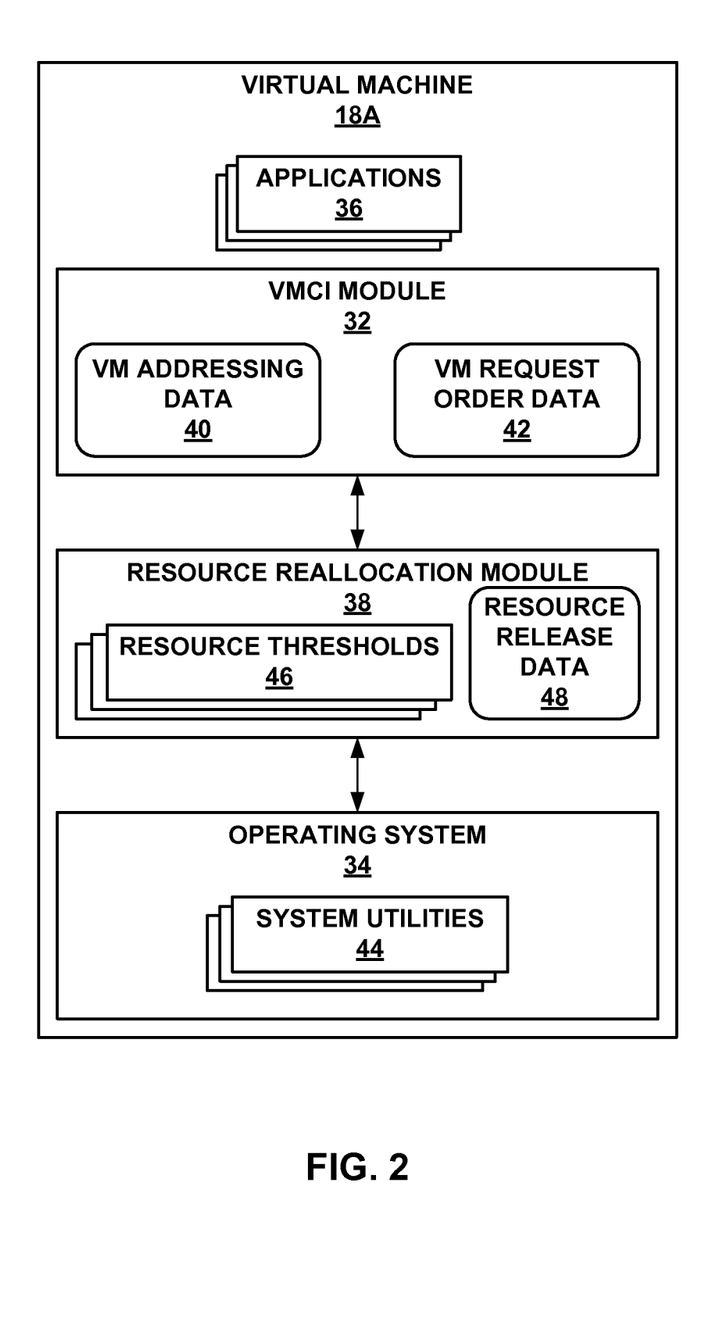
FIG. 2 is a block diagram illustrating the virtual machine of FIG. 1 in more detail.

FIG. 2 is a block diagram illustrating virtual machine 18A of FIG. 1 in more detail. While described with respect to a particular one of virtual machines 18, i.e., virtual machine 18A, the techniques may be implemented by one or more, if not all, of virtual machines 18, especially considering that these techniques generally require each of virtual machines 18 to implement the VMCI. Thus, the description of the techniques with respect only to virtual machine 18A is not intended to suggest that only virtual machine 18A implements these techniques. Rather, the techniques are described with respect to virtual machine 18A only for ease of illustration purposes and the description of the techniques with respect to virtual machine 18A may apply equally to virtual machines 18 in general.

In the example of FIG. 2, virtual machine 18A includes VMCI module 32 as described above, as well as, an operating system 34, applications 36, and a resource reallocation module 38. As noted above, VMCI module 32 provides the interface by which virtual machine 18A communicates with either other ones of virtual machines 18 or hypervisor 20 and by way of hypervisor 20 the other ones of virtual machines 18. VMCI module 32 stores virtual machine (VM) addressing data 40 ("VM addressing data 40") and VM request order data 42. VM addressing data 40 defines addresses for use by VMCI module 32 in routing VMCI messages to any given one of the other ones of virtual machines 18. In some instances, hypervisor 20 maintains a central VM addressing data store and distributes VM addressing data 40 to virtual machines 18 via the VMCI. This distribution may occur periodically or in response to a request for this data from virtual machines 18. VM request order date 42 defines an order by which requests are issued to the other ones of virtual machines 18. Operating system 34 represents any type of operating system including open source operating systems, such as one or more open source Linux distributions, or proprietary operating systems, such as Windows operating systems, Mac OS X operating systems, or JunOS operating system.

Operating system 34 includes system utilities 44, which while shown as being included or residing within operating system 34 in the example of FIG. 2, may alternatively reside outside of operating system 34 similar to applications 36. System utilities 44 implement one or more of the system utilities described above. Again, these system utilities 44 may perform one or more operations, including taking a periodic system snapshot for backup purposes, event or periodic logging for debug purposes, node monitoring, finding timed-out users, removing invalid network sessions, network cockpit graphing (which involves graphing to show system parameters, like the number of concurrent users, central processing unit (CPU)/memory utilization, number of connections of different kinds, hits per second, throughput, etc.), performing periodic domain name service (DNS) resolution, cleaning up of stale secure SSL VPN meeting sessions, and performing dynamic policy evaluation for currently logged-in users.

Applications 36 represent software modules that perform some operation or implement some functionality. In this disclosure, it is assumed for illustrative purposes that virtual machines 18 have been specifically configured to perform SSL VPN services, thereby transforming these general purpose virtual machines 18 into SSL VPN virtual appliances 18. In this assumed exemplary context, applications 36 may each provide SSL VPN services or one or more aspect of SSL VPN services. Outside of this assumed context, applications 36 may include any application normally executed by an ordinary network device or computer, such as word processing applications, server applications, web browsers, configuration interfaces, or any other type of application normally executed by a network or computer device.

Resource reallocation module 34 represents a module that performs resource reallocation, which generally involves monitoring virtual resource utilization, detecting overutilization based on comparisons of this utilization against one or more of resource thresholds 46 and reconfiguring the utilization of system utilities 44 in response to resource requests from other ones of virtual machines 18. Resource thresholds 46, in some instances, are dynamic in the sense that one or more resource thresholds 46 may be dynamically updated by resource reallocation module 38. Resource reallocation module 38 may, for example, perform one or more mathematical operations to dynamically determine or set one or more of resource thresholds 46. Alternatively, an administrator, such as admin 24 shown in the example of FIG. 1, may statically configure or set resource thresholds 46.

During execution, operating system 34 enables applications 36 to utilize one or more of virtual resources 30A. Where applications 36 represent SSL VPN applications that provide SSL VPN services, applications 36 process incoming network traffic 16A utilizing virtual resources 30A, which again represent a portion of physical resources 28. Resource reallocation module 38 monitors this virtual resource 30A utilization, generating certain statistics, such as a percentage of virtual processor utilization, a percentage of virtual memory utilization or any other statistic or metric related to virtual resource 30A utilization. Resource reallocation module 38 compares these statistics or metrics to resource thresholds 46. Based on the comparison, resource reallocation module 38 invokes VMCI module 32 to request additional resources.

Assuming additional virtual resources are required, VMCI module 32 generates a request for the additional resources, addressing it to either another one of virtual machines 18 based on VM addressing data 40 and VM request data 42 or hypervisor 20. Regardless of the destination, VMCI module 32 of virtual machine 18A receives a response. If addressed to another one of virtual machines 18, the response may indicate that this other one of virtual machines 18 cannot release the resources, whereupon VMCI module 32 generates another response for additional resources, addressing this response in accordance with VM addressing data 40 and VM request data 42. If addressed to hypervisor 20, the response generally provides the additional virtual resources for use by virtual machine 18A considering that hypervisor 20 manages the process of locating and reallocating these virtual resources. VMCI module 32 provides these additional resources to resource reallocation module 38, which proceeds to add these additional resources to virtual resources 30A for use by virtual machine 18A. Resource reallocation module 38 performs this reallocation in the VM-to-VM implementation by invoking VMCI module 32 to issue a reallocation message requesting that hypervisor 20 reallocate the resources from the other one of virtual machines 18 to virtual machine 18A.

VMCI module 32 also generally listens or monitors its communication channels or ports to receive communications, e.g., requests, from either another one of virtual machines 18 or hypervisor 20. VMCI module 32 provides these requests to resource reallocation module 38, which proceeds to determine whether or not virtual machine 18A if fully utilizing its virtual resources 30A or whether various ones of system utilities 44 can be stopped, delayed, or reduced in frequency of execution to reduce virtual resource 30A utilization to free up virtual resources 30A for use by the requesting one of virtual machines 18. If not fully utilizing its virtual resources 30A, resource reallocation module 38 need not stop, delay or reduce the frequency of execution of system utilities 44 assuming available virtual resources 30A are sufficient to satisfy the request. Otherwise, resource reallocation module 38 stops, delays or reduces the frequency of execution of one or more system utilities 44 until available ones of virtual resources 30A are enough to satisfy the request. Resource reallocation module 38 generally stores resource release data 48. Resource release data 48 represents configuration data that defines the manner by which resource reallocation module 38 stops, delays or reduces the frequency of execution of system utilities 44. This data 48 may, for example, define an order by which to scale back the execution of system utilities 44, an order by which to stop execution of system utilities 44 or any other configuration data relevant to managing the execution of system utilities 44 such that one or more virtual resources 30A may be freed for use by another one of virtual machines 18. Resource release data 48 may also store the system utility profiles or logs documenting resource utilization, such as processor utilization and memory and/or storage device utilization.

Figure 3:
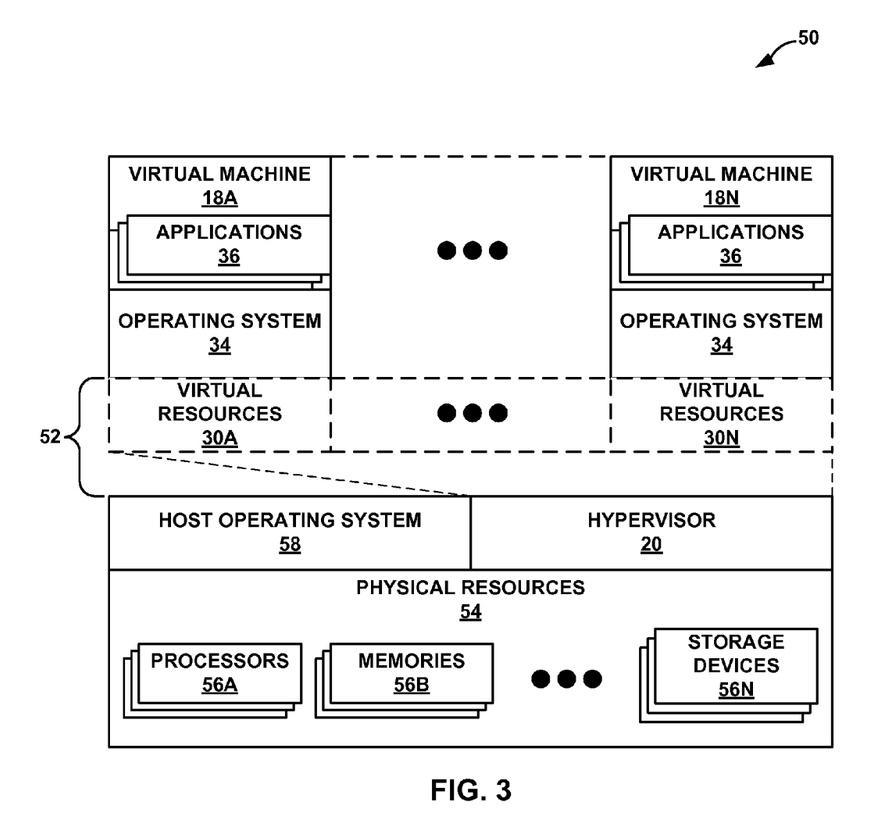
FIG. 3 is a diagram illustrating hierarchical layers that denote layers of component organization within a network device that implements the techniques described in this disclosure.

FIG. 3 is a diagram illustrating hierarchical layers 50 that denote layers of component organization within a network device, such as network device 10 of FIG. 1, that implements the techniques described in this disclosure. In the example of FIG. 3, hierarchical layers 50 illustrate dependencies among various components of network device 10. The lowest layer is a physical resources layer, which is shown as "physical resources 54" in the example of FIG. 3. Physical resources 54 include one or more processors 56A, one or more memories 56B, one or more storage devices 56N and any other physical resource commonly found in a network or computing device, such as interface cards, Universal System Bus (USB) cards or ports, any other port or interface, one or more graphics cards, and one or more sound cards.

Executing on physical resources 54 is the operating system layer, which is shown in the example of FIG. 3 as "host operating system 58." Hypervisor 20 may execute in this operating system layer in instances where hypervisor 20 executes on so-called "bare metal" or directly on physical resources 54. In this sense, hypervisor 20 may form part of an operating system similar to host operating system 58. Alternatively, hypervisor 20 may execute within an application executing on host operating system 58, or more specifically, within the environment provided by host operating system 58. In any event, hypervisor 20 abstracts physical resources 54 in a manner that creates virtual environment 52. Hypervisor 20 then partitions physical resources 54 and abstracts these partitions as virtual resources 30 within virtual environment 52. Hypervisor 20 then executes virtual machines 18A on these virtual resources 30A. As shown in the example of FIG. 3, operating systems 34 within each of virtual machines 18 execute on virtual resources 30 with applications 36 executing on operating system 34.

Figure 4:
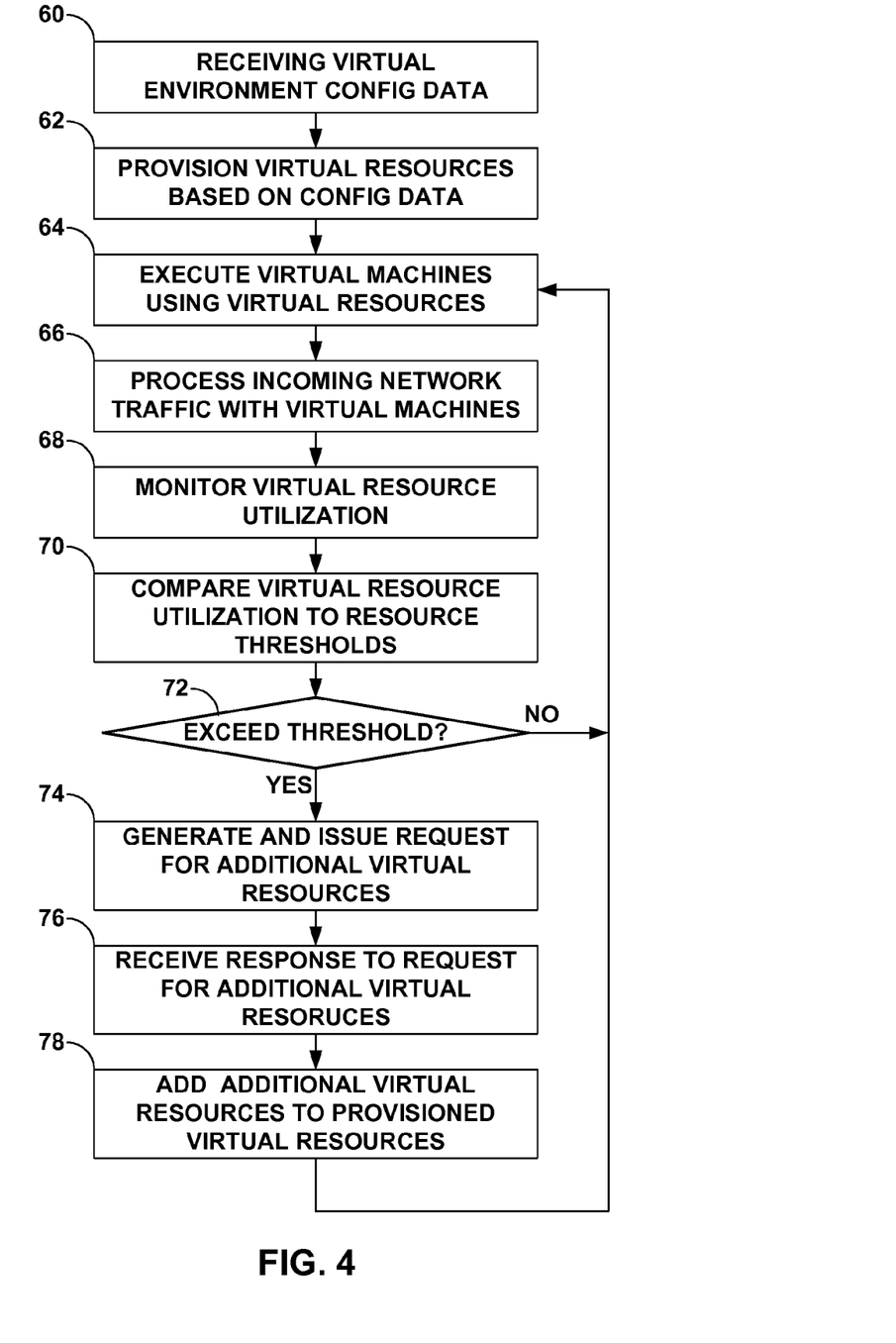
FIG. 4 is a flowchart illustrating example operation of a network device in implementing various aspects of the techniques described in this disclosure.

FIG. 4 is a flowchart illustrating example operation of a network device, such as network device 10 shown in the example of FIG. 1, in implementing various aspects of the techniques described in this disclosure. While described with respect to network device 10 shown in the example of FIG. 1, the techniques may be implemented by any network or computing device capable of providing a virtual environment in which two or more virtual machines execute.

Initially, an administrator, such as admin 24, or other user interacts with UI module 22 to enter virtual environment configuration data 26, which UI module 22 receives and stores (60). In response to this configuration data 26, hypervisor 62 provisions virtual resources 30 within virtual environment 52 (which is shown in the example of FIG. 3) and initiates execution of virtual machines 18 using virtual resources 30 (62, 64). Once stated, virtual machines 18 execute using virtual resources 30 to process incoming network traffic 16A, as described above (66).

Referring to the example of FIG. 2, during operation, resource reallocation module 38 of each of virtual machines 18 monitors utilization of virtual resources 30 (68). Each of resource reallocation module 38 may generate statistics or other metrics representative of various utilizations of virtual resources 30 and compare these statistics or other metrics representative of various utilizations of virtual resources 30 to resource thresholds 46 (70).

If one or more of these metrics or statistics exceed its corresponding one or more resource thresholds 46 ("YES" 72), resource reallocation module 38 invokes VMCI module 32 to generate and issue a request for additional resources (74). The comparison of the statistics or metrics to resource thresholds 46 may occur in such a manner that a request for additional resources only requires one statistic or metric to exceed its corresponding threshold. Alternatively, a weighted average of metrics or statistics may be compared against a corresponding combined threshold 46. While it is assumed in this disclosure that each statistic is compared to its corresponding threshold 46 to trigger the generation and issuance of the request for additional resources, the techniques may be implemented in any manner so long as the request is generated and issued when additional resources are required.

In the VM-to-VM implementation, VMCI module 32 generates this request for additional resources based on VM addressing data 40 and VM request data 42, as described in more detail above. In the VM-to-hypervisor implementation, VMCI module 32 generates this request for additional resources such that it is addressed to hypervisor 20. Regardless of the implementation, VMCI module 32 receives a response to the request for additional virtual resources (76). In the VM-to-VM implementation, this response may deny the request for additional virtual resources, whereupon VMCI module 32 continues to generate and issue requests for additional virtual resources to other ones of virtual machines 18 based on VM addressing data 40 and VM request data 42, as described in more detail above. If VMCI module 32 exhausts the list of VM addresses without receiving a response granting additional resources, the VMCI module may wait a configurable period of time and reinitiate the requesting sequence. In addition, or alternatively, VMCI module 32 may reduce the amount of resources requested.

In the VM-to-hypervisor implementation, VMCI module 32 receives a response that more than likely provides the requested additional virtual resources considering that hypervisor 20 manages the request for the additional virtual resources until these additional resources are located and provided to the requesting one of virtual machines 18 via the response. That is, hypervisor 20 issues its response informing the requesting one of virtual machines 18 that it has located the additional resources and reallocated those resources in the manner described above. If, however, hypervisor 20 is unable to fulfill the request such that the request is denied or times out, the VMCI module may wait a configurable period of time and resend the request for the same or a reduced amount of resources.

In the VM-to-VM context, if the response provides the additional virtual resources, resource reallocation module 38 adds the additional virtual resources to the corresponding one of virtual resources 30 in the manner described above (78). That is, resource reallocation module 38 invokes VMCI module 32 to issue a reallocation message requesting that hypervisor 20 reallocate the resources identified in the reallocation message from the one of virtual machines 18 identified in the message to the one of virtual machines 18 identified in the message, which is the one of virtual machines 18 in which resource reallocation module 38 executes. Resource reallocation module 38 also generally adds the virtual resources to its resource release data 48 so that it can correctly monitor the utilization of such resources. In the VM-to-hypervisor implementation, resource reallocation module 38 generally only adds the virtual resources to its resource release data 48 so that it can correctly monitor the utilization of such resources. The requesting one of virtual machines 18 then executes within its corresponding expanded one of virtual resources 30 to process incoming network traffic 16A (64, 66). This process continues in the manner described above to dynamically reallocate virtual resources based on the corresponding utilization of such virtual resources.

Figure 5:
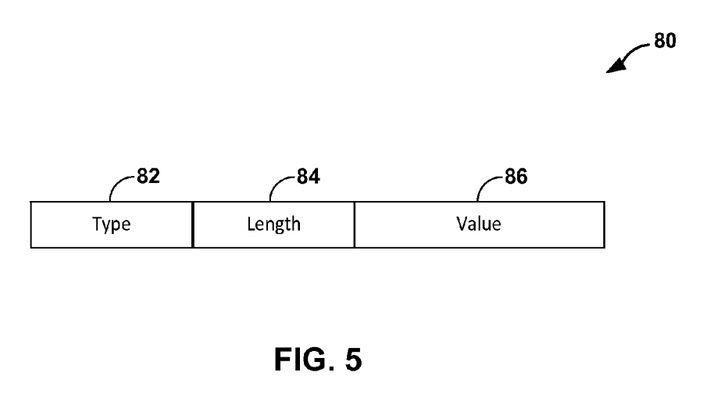
FIG. 5 is a block diagram illustrating an example message issued by a virtual machine in accordance with the techniques described in this disclosure.

FIG. 5 is a block diagram illustrating an example portion 80 of a message issued by a virtual machine, such as virtual machine 18A shown in the example of FIG. 2, in accordance with the techniques described in this disclosure. Message 80 includes three fields, a type field 82, a length field 84 and a value field 86 and complies with VMCI. This message 80 is formatted in a standard type-length-value (TLV) format. Message 80 may include additional fields not shown in the example of FIG. 5, such as a destination address field and a source address field, which may be specified in a header of message 80. This header, however, is not shown for ease of illustration purposes. More information regarding VMCI and, particularly, VMCI messages and sockets can be found in a document entitled "VMCI Sockets Programming Guide," published by VMWare, Inc., and herein incorporated by reference in its entirety as if fully set forth herein.

Type field 82 specifies the type of the message. If type field 82 specifies a value of one (1), message 80 is a request for more memory. If type field 82 specifies a value of two (2), message 80 is a response assigning additional memory for use by a requesting one of virtual machines 18. If type field 82 specifies a value of three (3), message 80 is a response releasing additional memory for use by a requesting one of virtual machines 18. In each of these instances, length field 84 specifies a length of message 80, which in all three instances noted above for type field 86 specifies a value of 12 bytes. Value field 86 specifies an amount of memory requested in megabytes (MBs) (i.e., when type field 82 specifies a value of one in this example), an amount of memory assigned in MBs (i.e., when type field 82 specifies a value of two in this example), or an amount of memory released in MBs (i.e., when type field 82 specifies a value of three in this example).

In the example of FIG. 5, message 80 is described in the context of the VM-to-hypervisor implementation. To illustrate, a message 80 with a type field 82 set to one is sent to hypervisor 20 to request additional memory specified in MBs in value field 86. Hypervisor 20 then generates another message 80 with a type field 82 set to three to one of virtual machines 18 instructing that one of virtual machines 18 to release either the full amount of memory specified in the first message 80 or a portion thereof. Hypervisor 20 then generates a third message 20 with a type field 82 set to two, assigning the amount of memory specified in value field 86 to the requesting one of virtual machines 18. In the VM-to-VM implementation, virtual machines 18 need only generate and issue a message 80 with a type field 82 set to one to request the amount of memory specified in a value field 86. The other one of virtual machines 18 that receives this request then responds with a message 80 having a type field 82 set to two, indicating that it is assigning the amount of memory specified in value field 86 of this second message 80 to the requesting one of virtual machines 18. In this manner, the VM-to-VM implementation may be more efficient in terms of the number of messages required to perform the reallocation operations.

While described above with respect to the request, release and assignment of a particular physical resource, i.e., memory in this example, message 80 may include type fields with other values. These other values may specify requests, releases and assignments of different physical resources, such as processor time, storage device space, use of an interface card, graphics card, sound card or any other physical resource. Consequently, the discussion of message 80 with respect to requests, releases and assignment of memory is merely for purposes of discussion and should not be construed as limiting the techniques of the invention described in this disclosure.

Moreover, while described above as including only three types of messages, other types of messages or messages having different fields may comply with the techniques of this disclosure. For example, some messages 80 may include an additional field to specify a duration during which the requesting one of virtual machines 18 may utilize the resource. In this respect, these messages 80 may resemble a loan of the resource specified by these messages 80. Some messages 80 may specify requests for a resource loan which, similar to the message loaning the resource, may include a field specifying a duration of the resource loan. In this case, any granted resources automatically revert back to the lending virtual machine 18 upon expiration of the resources, and such reversion may be triggered by a release message from the virtual machine to which the resources were loaned indicating that the resources are unused and ready to be transferred. Thus, while described above with respect to a certain message format, this message format may be expanded to incorporate other fields to accommodate certain functions pertinent to dynamic VM-initiated physical resource reallocation.

Various embodiments of the invention have been described. These and other embodiments are within the scope of the following claims.

The invention claimed is:
1. A method comprising:
partitioning, with a hypervisor executing within a network device, physical resources of the network device to allocate a first portion of the physical resources to a first virtual machine and a second portion of the physical resources to a second virtual machine;
executing the first and second virtual machines within the respective first and second partitions of the physical resources to process first and second portions of network traffic received by the network device;
determining, with the first virtual machine executing within the first partition of physical resources of the network device, whether physical resources in addition to those allocated in the first partition are required to process the first portion of the incoming network traffic;

requesting, with the first virtual machine, additional physical resources of the network device based on the determination;
dynamically reallocating at least a portion of the physical resources allocated to the second partition to the first partition in response to the request so as to form an expanded first partition of the physical resources in which the first virtual machine executes to process the first portion of the incoming network traffic and a reduced second partition in which the second virtual machine executes to process the second portion of the incoming network traffic;
executing the first virtual machine within the expanded first partition to process the first portion of the incoming network traffic; and
executing the second virtual machine within the reduced second partition to process the second portion of the incoming network traffic.

2. The method of claim 1,
wherein requesting additional physical resources includes issuing a request via a virtual machine communication interface directly to the second virtual machine without the hypervisor being involved in the request, wherein the request requests that the second virtual machine release one or more of the physical resources of the second partition for use by the first virtual machine in the first partition, and
wherein dynamically reallocating at least the portion of the physical resources allocated to the second partition comprises:
releasing, in response to the request, at least the portion of the physical resources allocated to the second partition with the second virtual machine for use by the first virtual machine;
generating a response that indicates the requested one or more of the physical resources of the second partition have been released;
outputting the response to the first virtual machine;
in response to receiving the response from the second virtual machine, generating a reallocation message identifying the second virtual machine, the requested one or more physical resources and the first virtual machine and requesting that the requested one or more physical resources be reallocated from the second virtual machine to the first virtual machine;
outputting the reallocation message to the hypervisor; and
in response to receiving the reallocation message, dynamically reallocating the requested one or more physical resources from the second partition to the first partition with the hypervisor so as to form the expanded first partition of the physical resources in which the first virtual machine executes to process the first portion of the incoming network traffic and the reduced second partition in which the second virtual machine executes to process the second portion of the incoming network traffic.

3. The method of claim 2,
wherein the first and second partitions are first and second partitions of a plurality of partitions of the physical resources,
wherein the first and second virtual machines are first and second virtual machines of a plurality of virtual machines executing within the corresponding plurality of partitions of the physical resources,
wherein the method further comprises:
storing virtual machine data within each of the plurality of virtual machines identifying remaining ones of the plurality of virtual machines that are operational and executing within the network device, and
generating the request based on the virtual machine data such that the request is addressed to the second virtual machine.

4. The method of claim 3, further comprising updating the virtual machine data to reflect a current status of the plurality of virtual machine, wherein the virtual machine data, after being updated, identifies those of the plurality of virtual machines that are currently operational and executing within the network device.

5. The method of claim 1,
wherein requesting additional physical resources includes issuing a request via a virtual machine communication interface to the hypervisor, wherein the request requests that the additional physical resources be allocated to the first partition, and
wherein dynamically reallocating at least the portion of the physical resources allocated to the second partition comprises dynamically reallocating at least the portion of the physical resources allocated to the second partition with the hypervisor in response to the request so as to form the expanded first partition of the physical resources in which the first virtual machine executes to process the first portion of the incoming network traffic and the reduced second partition in which the second virtual machine executes to process the second portion of the incoming network traffic.

6. The method of claim 1,
wherein requesting additional physical resources includes issuing a request via a virtual machine communication interface to the hypervisor, wherein the request requests that the additional physical resources be allocated to the first partition, and
wherein dynamically reallocating at least the portion of the physical resources allocated to the second partition comprises:
issuing, with the hypervisor, a first message instructing the second virtual machine to release physical resources from the second partition of the physical resources;
issuing, with the hypervisor, a second message to the first virtual machine instructing the first virtual machine that the released physical resources from the second partition of the physical resources are ready for use by the first virtual machine; and
dynamically reallocating the released physical resources from the second partition to the first partition of the physical resources.

7. The method of claim 1, further comprising:
executing, with the second virtual machine, one or more system utilities or applications; and
storing resource release data with the second virtual machine that defines how to alter the current execution of the one or more system utilities to release one or more of the physical resources of the second partition of the physical resources,
wherein dynamically reallocating at least a portion of the physical resources allocated to the second partition to the first partition in response to the request comprises:
dynamically altering the execution of the one or more system utilities or applications to release one or more of the physical resources of the second partition of the physical resources such that these released physical resources of the second partition of the physical resources are available for use by the first virtual machine; and dynamically reallocating the released physical resources from the second partition to the first partition of the physical resources.

8. The method of claim 7, wherein executing one or more system utilities or applications comprises executing one or more system utilities that perform one or more of:
taking a periodic system snapshot for backup purposes;
event or periodic logging for debug purposes;
finding timed-out users;
removing invalid network sessions;
graphing to show a number of concurrent users, central processing unit (CPU)/memory utilization, a number of connections of different kinds, hits per second, and throughput;
performing periodic domain name service (DNS) resolution;
cleaning up of stale secure socket layer (SSL) virtual private network (VPN) secure meeting sessions; and
performing dynamic policy evaluation for currently logged-in users.

9. The method of claim 1,
wherein the first and second virtual machines are specifically configured as secure socket layer (SSL) virtual private network (VPN) virtual appliances that perform SSL VPN services to process the incoming network traffic, and
wherein the physical resources include any combination of one or more processors, one or more memories and one or more storage devices.

10. A network device comprising:
at least one interface that receives network traffic;
physical resources;
a first virtual machine executing within a first partition of the physical resources to process a first portion of the network traffic;
a second virtual machine executing within a second partition of the physical resources to process a second portion of the network traffic; and
a hypervisor that partitions the physical resources to allocate the first portion of the physical resources to the first virtual machine and the second portion of the physical resources to the second virtual machine,
wherein the first virtual machine determines whether physical resources in addition to those allocated by way of the first partition are required to process the incoming network traffic, and issues a request directly to the second virtual machine requesting that the second virtual machine reallocate at least a portion of the physical resources allocated to the second partition based on the determination,
wherein, in response to the request, the second virtual machine dynamically reallocates at least a portion of the physical resources allocated to the second partition to the first partition in response to the request so as to form an expanded first partition of the physical resources in which the first virtual machine executes to process the incoming network traffic and a reduced second partition in which the second virtual machine executes to process the incoming network traffic,
wherein the first virtual machine executes within the expanded first partition to process the first portion of the incoming network traffic, and
the second virtual machine executes within the reduced second partition to process the second portion of the incoming network traffic.

11. The network device of claim 10,
wherein the first and second partitions are first and second partitions of a plurality of partitions of the physical resources,
wherein the first and second virtual machines are first and second virtual machines of a plurality of virtual machines executing within the corresponding plurality of partitions of the physical resources,
wherein each of the plurality of virtual machines store virtual machine data identifying remaining ones of the plurality of virtual machines that are operational and executing within the network device, and
wherein the first virtual machine generates the request based on the virtual machine data such that the request is addressed to the second virtual machine.

12. The network device of claim 11,
wherein each of the plurality of virtual machines update the virtual machine data to reflect a current status of the plurality of virtual machine, and
wherein the virtual machine data, after being updated, identifies those of the plurality of virtual machines that are currently operational and executing within the network device.

13. The network device of claim 10,
wherein the second virtual machine executes one or more system utilities or applications stores resource release data that defines how to alter the current execution of the one or more system utilities and applications to release one or more of the physical resources of the second partition of the physical resources, dynamically alters the execution of the one or more system utilities or applications to release one or more of the physical resources of the second partition of the physical resources such that these released physical resources of the second partition of the physical resources are available for use by the first virtual machine, and
wherein the hypervisor dynamically reallocates the released physical resources from the second partition to the first partition of the physical resources.

14. The network device of claim 13, wherein the second virtual machine executes one or more system utilities that perform one or more of taking a periodic system snapshot for backup purposes, event or periodic logging for debug purposes, finding timed-out users, removing invalid network sessions, graphing to show a number of concurrent users, central processing unit (CPU)/memory utilization, a number of connections of different kinds, hits per second, and throughput, performing periodic domain name service (DNS) resolution, cleaning up of stale secure socket layer (SSL) virtual private network (VPN) secure meeting sessions, and performing dynamic policy evaluation for currently logged-in users.

15. The network device of claim 10,
wherein the first and second virtual machines are specifically configured as secure socket layer (SSL) virtual private network (VPN) virtual appliances that perform SSL VPN services to process the incoming network traffic, and
wherein the physical resources include any combination of one or more processors, one or more memories and one or more storage devices.

16. A network device comprising:
at least one interface that receives network traffic;
physical resources;
a first virtual machine executing within a first partition of the physical resources to process a first portion of the network traffic;

a second virtual machine executing within a second partition of the physical resources to process a second portion of the network traffic; and a hypervisor that partitions the physical resources to allocate the first portion of the physical resources to the first virtual machine and the second portion of the physical resources to the second virtual machine, wherein the first virtual machine determines whether physical resources in addition to those allocated by way of the first partition are required to process the incoming network traffic, and issues a request to the hypervisor requesting physical resources in addition to the physical resources allocated to the first partition based on the determination, wherein the hypervisor dynamically reallocates at least a portion of the physical resources from the second partition to the first partition in response to the request so as to form an expanded first partition of the physical resources in which the first virtual machine executes to process the incoming network traffic and a reduced second partition in which the second virtual machine executes to process the incoming network traffic, wherein the first virtual machine executes within the expanded first partition to process the first portion of the incoming network traffic, and the second virtual machine executes within the reduced second partition to process the second portion of the incoming network traffic.

17. The network device of claim 16, wherein the hypervisor issues a first message instructing the second virtual machine to release physical resources from the second partition of the physical resources, issues a second message to the first virtual machine instructing the first virtual machine that the released physical resources from the second partition of the physical resources are ready for use by the first virtual machine and dynamically reallocates the released physical resources from the second partition to the first partition of the physical resources.

18. The network device of claim 16, wherein the second virtual machine executes one or more system utilities or applications stores resource release data that defines how to alter the current execution of the one or more system utilities and applications to release one or more of the physical resources of the second partition of the physical resources, dynamically alters the execution of the one or more system utilities or applications to release one or more of the physical resources of the second partition of the physical resources such that these released physical resources of the second partition of the physical resources are available for use by the first virtual machine, and wherein the hypervisor dynamically reallocates the released physical resources from the second partition to the first partition of the physical resources.

19. The network device of claim 18, wherein the second virtual machine executes one or more system utilities that perform one or more of taking a periodic system snapshot for backup purposes, event or periodic logging for debug purposes, finding timed-out users, removing invalid network sessions, graphing to show a number of concurrent users, central processing unit (CPU)/memory utilization, a number of connections of different kinds, hits per second, and throughput, performing periodic domain name service (DNS) resolution, cleaning up of stale secure socket layer (SSL) virtual private network (VPN) secure meeting sessions, and performing dynamic policy evaluation for currently logged-in users.

20. The network device of claim 16, wherein the first and second virtual machines are specifically configured as secure socket layer (SSL) virtual private network (VPN) virtual appliances that perform SSL VPN services to process the incoming network traffic, and wherein the physical resources include any combination of one or more processors, one or more memories and one or more storage devices.

21. A non-transitory computer-readable medium storing instructions, that when executed by a processor, cause the processor to:

partition, with a hypervisor executing within a network device, physical resources of the network device to allocate a first portion of the physical resources to a first virtual machine and a second portion of the physical resources to a second virtual machine;

execute the first and second virtual machines within the respective first and second partitions of the physical resources to process first and second portions of network traffic received by the network device;

determine, with the first virtual machine executing within the first partition of physical resources of the network device, whether physical resources in addition to those allocated in the first partition are required to process the first portion of the incoming network traffic;

request, with the first virtual machine, additional physical resources of the network device based on the determination;

dynamically reallocate at least a portion of the physical resources allocated to the second partition to the first partition in response to the request so as to form an expanded first partition of the physical resources in which the first virtual machine executes to process the first portion of the incoming network traffic and a reduced second partition in which the second virtual machine executes to process the second portion of the incoming network traffic;

execute the first virtual machine within the expanded first partition to process the first portion of the incoming network traffic; and execute the second virtual machine within the reduced second partition to process the second portion of the incoming network traffic.

22. The non-transitory computer-readable medium of claim 21, wherein the instructions, when executed by the processor, further cause the processor to:

issue a request via a virtual machine communication interface directly to the second virtual machine without the hypervisor being involved in the request, wherein the request requests that the second virtual machine release one or more of the physical resources of the second partition for use by the first virtual machine in the first partition, release, in response to the request, at least the portion of the physical resources allocated to the second partition with the second virtual machine for use by the first virtual machine;

generate a response that indicates the requested one or more of the physical resources of the second partition have been released;

output the response to the first virtual machine;

in response to receiving the response from the second virtual machine, generate a reallocation message identifying the second virtual machine, the requested one or more physical resources and the first virtual machine and requesting that the requested one or more physical resources be reallocated from the second virtual machine to the first virtual machine;

output the reallocation message to the hypervisor; and in response to receiving the reallocation message, dynamically reallocate the requested one or more physical resources from the second partition to the first partition with the hypervisor so as to form the expanded first partition of the physical resources in which the first virtual machine executes to process the first portion of the incoming network traffic and the reduced second partition in which the second virtual machine executes to process the second portion of the incoming network traffic.

23. The non-transitory computer-readable medium of claim 22, wherein the first and second partitions are first and second partitions of a plurality of partitions of the physical resources, wherein the first and second virtual machines are first and second virtual machines of a plurality of virtual machines executing within the corresponding plurality of partitions of the physical resources, wherein the instructions, when executed by the processor, further cause the processor to:

store virtual machine data within each of the plurality of virtual machines identifying remaining ones of the plurality of virtual machines that are operational and executing within the network device, and generate the request based on the virtual machine data such that the request is addressed to the second virtual machine.

24. The non-transitory computer-readable medium of claim 23, wherein the instructions, when executed by the processor, further cause the processor to update the virtual machine data to reflect a current status of the plurality of virtual machine, wherein the virtual machine data, after being updated, identifies those of the plurality of virtual machines that are currently operational and executing within the network device.

25. The non-transitory computer-readable medium of claim 21, wherein the instructions, when executed by the processor, further cause the processor to:

issue a request via a virtual machine communication interface to the hypervisor, wherein the request requests that the additional physical resources be allocated to the first partition, and dynamically reallocate at least the portion of the physical resources allocated to the second partition with the hypervisor in response to the request so as to form the expanded first partition of the physical resources in which the first virtual machine executes to process the first portion of the incoming network traffic and the reduced second partition in which the second virtual machine executes to process the second portion of the incoming network traffic.

26. The non-transitory computer-readable medium of claim 21, wherein the instructions, when executed by the processor, further cause the processor to:

issue a request via a virtual machine communication interface to the hypervisor, wherein the request requests that the additional physical resources be allocated to the first partition;

issue, with the hypervisor, a first message instructing the second virtual machine to release physical resources from the second partition of the physical resources;

issue, with the hypervisor, a second message to the first virtual machine instructing the first virtual machine that the released physical resources from the second partition of the physical resources are ready for use by the first virtual machine; and dynamically reallocate the released physical resources from the second partition to the first partition of the physical resources.

27. The non-transitory computer-readable medium of claim 22, wherein the instructions, when executed by the processor, further cause the processor to:

execute, with the second virtual machine, one or more system utilities or applications; and store resource release data with the second virtual machine that defines how to alter the current execution of the one or more system utilities or applications to release one or more of the physical resources of the second partition of the physical resources, dynamically alter the execution of the one or more system utilities to release one or more of the physical resources of the second partition of the physical resources such that these released physical resources of the second partition of the physical resources are available for use by the first virtual machine; and dynamically reallocate the released physical resources from the second partition to the first partition of the physical resources.

28. The non-transitory computer-readable medium of claim 27, wherein the instructions, when executed by the processor, further cause the processor to executing the one or more system utilities that performs one or more of:

taking a periodic system snapshot for backup purposes;

event or periodic logging for debug purposes;

finding timed-out users;

removing invalid network sessions;

graphing to show a number of concurrent users, central processing unit (CPU)/memory utilization, a number of connections of different kinds, hits per second, and throughput;

performing periodic domain name service (DNS) resolution;

cleaning up of stale secure socket layer (SSL) virtual private network (VPN) secure meeting sessions; and performing dynamic policy evaluation for currently logged-in users.

29. The non-transitory computer-readable medium of claim 21, wherein the first and second virtual machines are specifically configured as secure socket layer (SSL) virtual private network (VPN) virtual appliances that perform SSL VPN services to process the incoming network traffic, and wherein the physical resources include any combination of one or more processors, one or more memories and one or more storage devices.

* * * * *